United States Patent [19]

Chard

[11] Patent Number: 4,605,964
[45] Date of Patent: Aug. 12, 1986

[54] METHOD AND APPARATUS FOR EDITING THE OUTPUT OF A TELEVISION SET

[76] Inventor: Frederick W. Chard, 7, Graham Avenue, St. Austell, Cornwall, England

[21] Appl. No.: 525,034

[22] PCT Filed: Dec. 15, 1982

[86] PCT No.: PCT/GB82/00352
§ 371 Date: Aug. 9, 1983
§ 102(e) Date: Aug. 9, 1983

[87] PCT Pub. No.: WO83/02208
PCT Pub. Date: Jun. 23, 1983

[30] Foreign Application Priority Data

Dec. 19, 1981 [GB] United Kingdom ............. 8138341

[51] Int. Cl.⁴ .................... H04N 7/087; H04N 3/24
[52] U.S. Cl. ................................ 358/147; 358/165
[58] Field of Search ............. 358/114, 117, 118, 120, 358/122, 141, 142, 146, 147, 165, 188

[56] References Cited

U.S. PATENT DOCUMENTS 4,229,765  10/1980  Sanger ........................... 358/165
4,554,584  11/1985  Elam et al. .................... 358/165

Primary Examiner—James J. Groody
Assistant Examiner—Michael D. Parker
Attorney, Agent, or Firm—Cushman, Darby & Cushman

[57] ABSTRACT

In order to enable the editing of television programs in the home to exclude undesired sound or visual events (such as swearing or scenes of violence), these events are identified by coding inserted in the television signal prior to mass distribution. Preferably this coding is used to identify a range of possibly undesirable events, the coding including a grading of the events in terms of their undesirability. In the home, the coding is extruded from the received television signal by a suitable decoder. This coding is compared with a preset code identifying the grade or grades of event to be excluded; on the basis of this comparison the television signal is doctored before output on a television set. To facilitate following of the program being edited, only that portion of the television signal (sound or vision) carrying the undesired event is doctored.

9 Claims, 3 Drawing Figures

METHOD AND APPARATUS FOR EDITING THE OUTPUT OF A TELEVISION SET

The present invention relates to a method and apparatus for editing the output of a television set. In particular, but not exclusively, the invention relates to a television controller which can be set by a person in authority (such as a parent) to edit out undesired programme part-contents (such as scenes of violence, or unpleasant language); this editing can be carried out either in the television set itself or, in the case of pre-recorded programmes, in the recording or playback equipment.

Much has been written and said in recent years about the quality and content of broadcast television programmes. On the one hand, many people object to the degree of violence and unpleasant language included in programmes while, on the other hand, the sensitivity of the broadcasting authorities to accusations of censorship has made them reluctant to impose standards in areas of programme content which are arguably a matter of personal preference.

Many parents while recognising the dangers of mass censorship, feel that for the good of their own children they must exercise a domestic editing function, by forbidding their children to view certain programmes which the parents consider unsuitable. Of course, such editing cannot prevent children being subjected to unexpected bad language or violent scenes of short duration in programmes which are normally satisfactory from this point of view.

It is an object of the present invention to enable an editorial function to be exercised over the output of a television, this editing function being pre-selected by a person in authority (such as a parent or televison owner).

According to one aspect of the present invention, there is provided a method of editing the output of a television set, including the steps of:

(a) inserting into a television signal, prior to mass distribution, coding which individually identifies, as they occur, possibly undesirable sound and visual events forming part of a programme represented by said signal, the coding indicating the sound or visual nature of each said event, the method comprising the following further steps for implementation where it is desired, following mass distribution of said television signal, to edit out from said programme at least certain of said possibly-undesirable events:

(b) monitoring the television signal to identify said coding, (c) determining from the coding identified in step (b) the time of occurrence and nature of said possibly-undesirable events which are to be edited out, and (d) inhibiting the intelligible output, via said set, of the sound portion of said television signal when the determination effected in step (c) indicates the presence of a sound event to be edited out, and inhibiting the intelligible output of the vision portion of said signal when the determination effected in step (c) indicates the presence of a visual event to be edited out.

The method of the invention thus provides for editing out of possibly-undesirable events such as scenes of violence or bad language; this editing out is effectively at the discretion of the person receiving the television signal since if the method steps (b) to (d) are not implemented, the television signal will be output unedited.

The editing out can be effected by the complete deletion of the relevant sound or vision portion of the television signal or by the scrambling of this signal portion. Since the editing out of a sound or visual event only results in the inhibition of sound or vision as appropriate, the method of the invention facilitates the following of a programme subject to editing as compared to a method which involves the inhibition of the whole television signal.

The method of mass distribution of the television signal can take any form including normal broadcast transmission, cable network distribution, direct broadcast by satellite, and as a pre-recorded disc or tape. The editing effected in accordance with the invention takes place after this mass distribution but prior to the television signal being output via a television set. Thus the editing can take place in the television set itself, during recordal on a video tape machine, or on output from a video tape or disc player.

The insertion of the coding will generally be done at the originating television studio. Of course, what constitutes an undesirable event is entirely subjective but generally for any given period in history, there are certain matters which are offensive to a population taken as a whole, even though some individuals in that population may not concur with the general view. Furthermore, certain events will be on the borderline, being found inoffensive by large sections of the population but still offensive to other sections. For this reason, the term "possibly undesirable events" has been used to refer to the type of event to be subject to coding.

Advantageously, the possibly-undesirable events are graded to permit editing according to personal taste. The lowest grading may be used to indicate a mildly offensive event only, whereas the highest grading may indicate a highly offensive event. The person receiving the television signal determines the grade or grades of event to be edited out; thus, for example, the predetermined code may be set to a mid-range grade so that all events coded above this grade are edited out whereas those below are allowed through. Setting the grading of undesirable events is preferably effected independently for sound and vision.

The coding is preferably inserted into the television signal in the field blanking period and may take the form of one or more digital data words. The techniques required to insert data into a television signal in this manner are well known to persons skilled in the art, since teletext services generally operate on this principle (thus, for example, the Ceefax service provided by the British Broadcasting Corporation is of this form). In one preferred embodiment of the invention, the coding is, in fact, constituted by the row numbers of a particular page of a teletext service, the page number and relevant row number being transmitted in the next occurring field blanking period upon the occurrence of a possibly offensive event. At the receiving location, a teletext decoder is permanently set to look at the relevant page and identifies each row number as and when transmitted, the particular row numbers indicating particular gradings of sound and vision events.

The identification of an undesired event is preferably used to blank sound or vision, as appropriate, for a given time period of, for example, ½ second so as to avoid the need to continually insert the said coding throughout the duration of a possibly undesirable event.

If an event lasts longer than this time period, then the relevant identifying coding is inserted again just before the end of this period.

The generation and insertion of the coding into the television signal at the correct time is no great problem for programmes which are not transmitted live since the programme can be viewed on a video tape machine and the start of each event accurately determined using the frame hold and rewind capabilities of such a machine. However, the insertion of coding is clearly less easily effected where "live" programmes are concerned. One possible way of coding "live" programmes is to feed the television signal through a delay (for example, of 2 seconds duration) during which time a monitoring operator views the transmission and adds the coding as appropriate.

According to another aspect of the present invention, there is provided a controller for editing out undesired sound and visual events from a television signal where this signal includes coding individually identifying, as they occur, certain possibly-undesirable events forming part of a programme represented by the signal, the coding including an indication of the sound or visual nature of each such event, characterised in that the controller comprises:

monitor means for monitoring the television signal to identify said coding and output a corresponding coding signal, signal processing means connected to receive said coding signal and arranged to determine therefrom the time of occurrence and nature of said certain possibly-undesirable events, these latter events being events which are to be edited out, and inhibit means arranged to operate on said television signal such as to inhibit the intelligible output from said controller of the sound portion of said television signal when the signal processing means indicates the presence of a sound event to be edited out, and to inhibit the intelligible output from the controller of the vision portion of said television signal when the signal processing means indicates the presence of a visual event to be edited out.

Television edit-coding apparatus and a television receiver edit controller, both embodying the present invention, will now be described, by way of example, with reference to the accompanying diagrammatic drawings, in which.

The method and apparatus to be described hereinafter provide for the automatic editing of a television programme in the home in order to delete from the programme various grades of undesirable sound and visual events, the selection of the grades of event to be edited out being effected by a person in authority, such as a parent. This editing procedure is based upon the insertion into the television signal, prior to its mass distribution, of a coding which identifies the presence of a range of possibly undesirable events in the programme represented by the signal. The inserted coding is used to identify the grade of undesirability of each particular event as it occurs and also its sound or visual nature. On receipt of the television signal in the home, the signal is monitored to identify the aforesaid coding and edit out from the television signal each sound or visual event the grading of which indicates that it is of a type which the person in authority does not wish to be output.

In the embodiment of the invention to be described, the coding indicating the presence of possibly undesirable events takes the form of the row addresses of a particular page of a teletext signal carried by the television transmission. To enable a clear understanding of the described embodiment, a brief description will therefore first be given of a suitable teletext system such as the Ceefax service provided by the British Broadcasting Corporation.

In the Ceefax teletext service which is used with a 625 line television standard, digital data is added to the television signal during two lines of each field of the signal. These two lines are chosen to occur during the field blanking period which is typically of 25 lines duration. More particularly, lines 17 and 18 of the first field of a frame and lines 330 and 331 of the second field may be used for the teletext data. Four lines of data are thus transmitted in each frame giving, for a frame repetition rate of 25 frames per second, a data line rate of 100 lines per second.

Each teletext data line corresponds to a row of data for display. For convenience of operation, the data rows are organised into "pages" of twenty four rows, each page being intended to be displayed whole. To aid identification and selection of required data, these pages are considered as being organised into "magazines" of one hundred pages. Typically eight magazines may be provided in a teletext service. Of course, a single insertion of all possible data rows into the television signal takes a substantial amount of time (around three minutes); however, in practice, the most commonly required data is inserted at much more frequent intervals.

Figure 1:
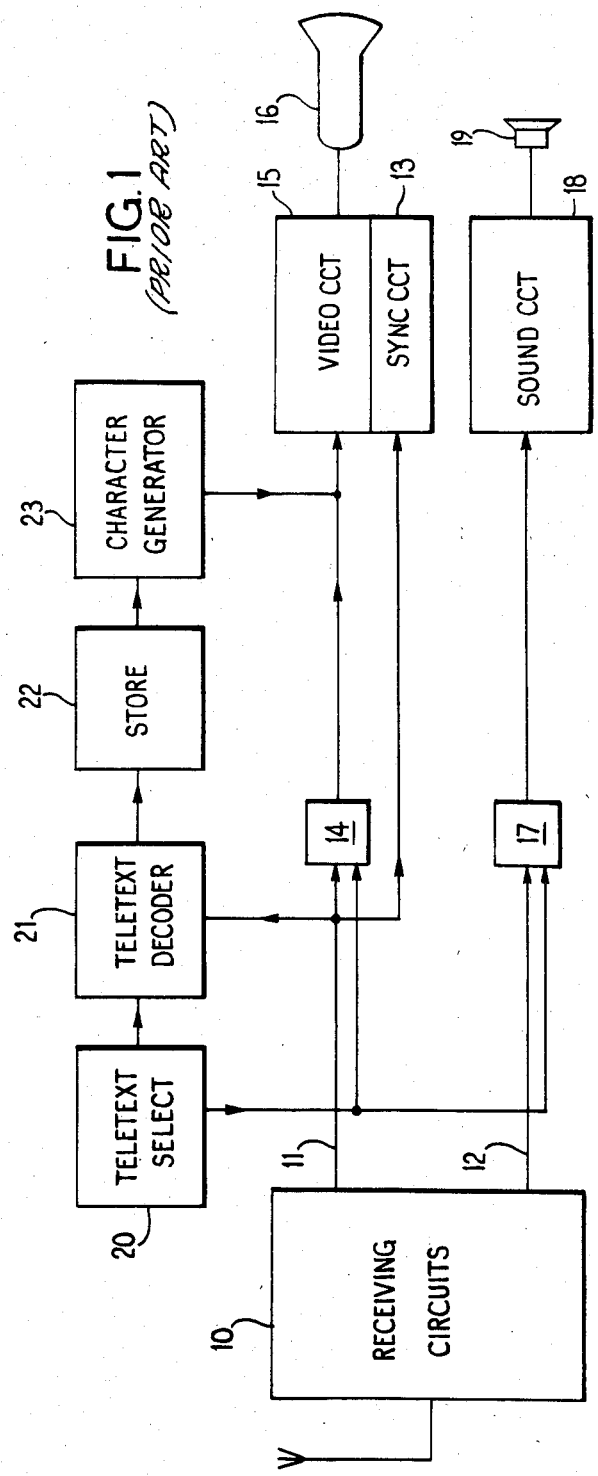
FIG. 1 is a block diagram of a prior art television receiving set provided with a standard teletext unit.

FIG. 1 shows in block diagram form a television receiver selectively operable to display teletext data. The receiver comprises standard RF and IF receiving circuits 10 which output video and sound signals on lines 11 and 12 respectively. The video signal is fed to a synchronisation circuit 13 of the receiver and, via a gate 14, to a video circuit 15 the operation of which is controlled from the circuit 13. The output of the video circuit 15 is fed to a television tube 16. The sound signal from the receiving circuits 10 is fed, via a gate 17, to a sound circuit 18 used to drive a loudspeaker 19.

The operation of the gates 14, 17 is controlled by a teletext select unit 20, these gates being enabled to permit normal operation of the television receiver whenever the teletext service is not required.

To display a particular page of teletext data, the select unit 20 is operated to inhibit the gates 14 and 17 and enable a teletext decoder 21 of the receiver. This decoder 21 receives the video signal from the receiving circuits 10 and picks out from this signal the teletext data included therein. A detailed description of how this is achieved will not be given herein since the techniques involved are well known.

The select unit 20 is used to specify the page of teletext data required to be display. The decoder 21 monitors the received data and stores the relevant page of data when received, this data being held in store 22. The stored data is accessed by a character generator 23 which operates to generate a video signal providing for the alphanumeric display of the digital data held in the store 22. This video signal is fed to the circuit 15 whereby the selected page of data is displayed on the tube 16.

To enable the decoder 21 to identify the data to be displayed, it is, of course, necessary for the teletext data carried by the television signal to be appropriately marked with its magazine and page number. Furthermore, each row of data is marked with the corresponding row number to facilitate reconstitution of the relevant data page.

Figure 2:
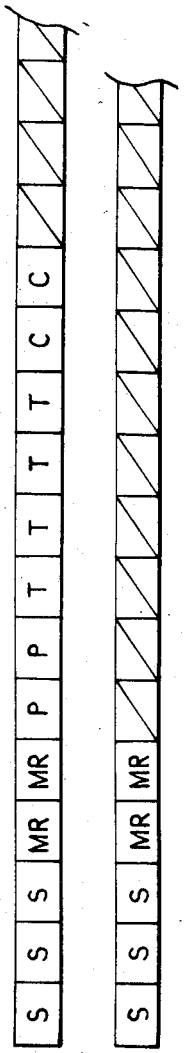
FIG. 2 is a representation of parts of two lines of data of a standard teletext transmission.

FIG. 2 shows in diagrammatic form the make-up of the initial portions of two data rows, the upper row corresponding to the first or "header" row of a page and the lower row corresponding to any one of the other twenty three rows of a page.

Each row is made up of 45 data bytes. In the header row, 32 of these bytes represent data for display whereas in the remaining rows 40 bytes are assigned to this task (in FIG. 2 the bytes containing data for display are marked with a diagonal line). Of the remaining bytes in each row, the first three (marked S) contain synchronisation information while the fourth and fifth bytes (marked MR) indicate the magazine number and row address of the particular data row concerned. In the header row only, the sixth and seventh bytes (marked P) contain page number information, bytes eight to eleven (marked T) contain time information and bytes twelve and thirteen (marked C) contain control information.

Returning to a consideration of the present invention, in the embodiment to be described the possibly objectionable events in a television programme are divided into eight categories, namely four gradings of possibly objectionable sound events and four gradings of possibly objectionable visual events. For ease of reference, these categories will hereinafter be referred to as GS1 to 4 for the sound event gradings and GV1 to 4 for the visual event gradings. Each event category is arranged to be represented by a corresponding coding enabling both the sound or visual nature and the grading of the event concerned to be identified. In the present embodiment, these codings are constituted by respective row addresses of a predetermined page of a teletext service; for convenience, these row addresses will be referred to by the event category which they designate (thus, for example, reference to row address GS2 is intended to mean that row address which represents the presence of a sound event having a grade 2 of undesirability).

Figure 3:
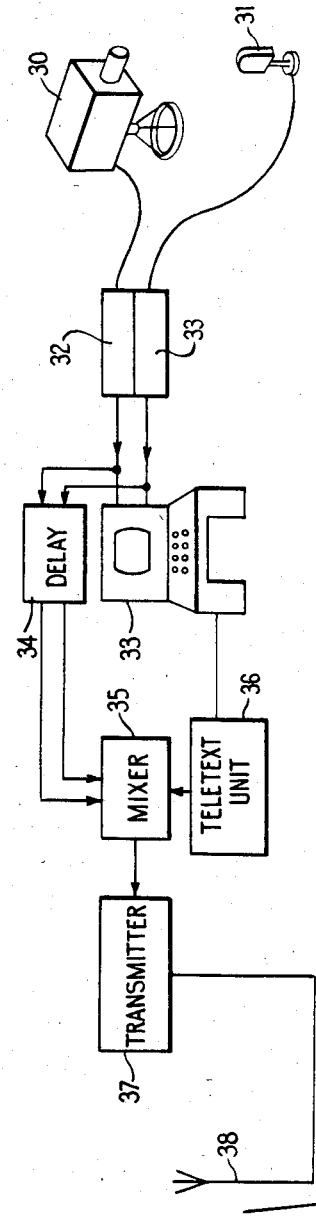
FIG. 3 is a block diagram of the edit coding apparatus and the edit controller.
Figure 3:
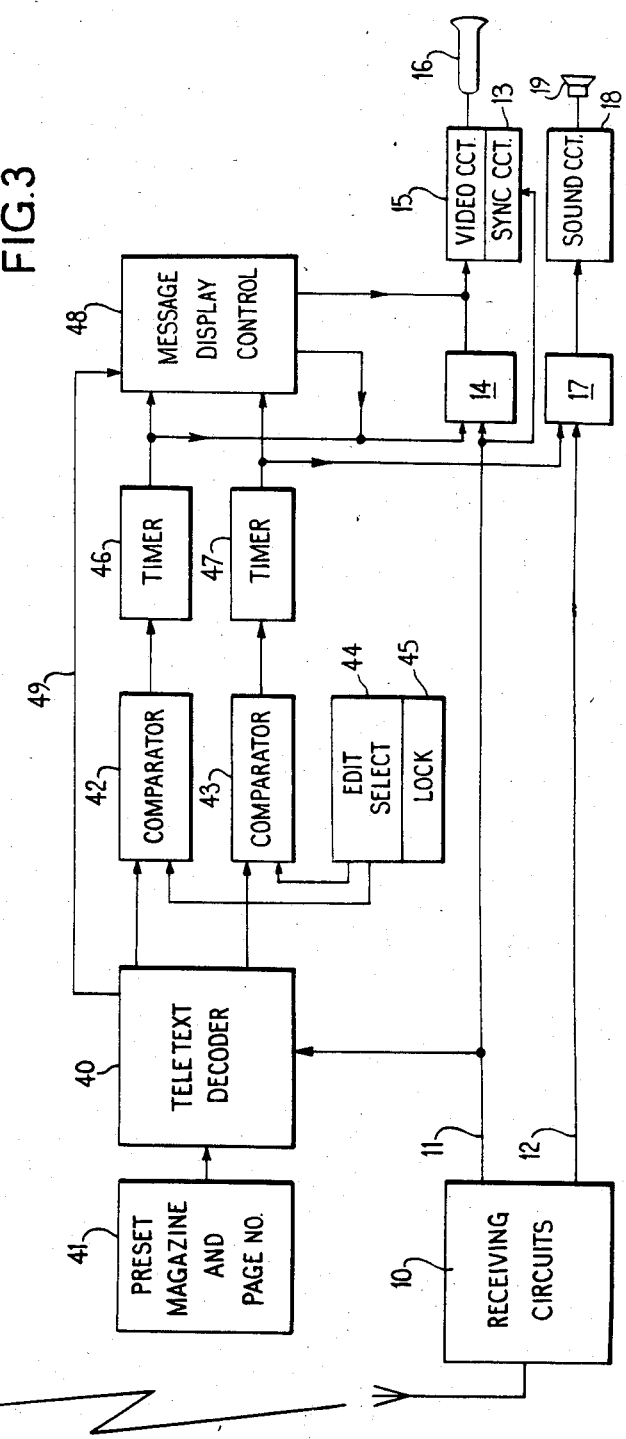

FIG. 3 illustrates how these row address codings might be generated in the case of a programme being transmitted live. The output of a camera 30 and of a microphone 31 are passed through respective processing circuits to produce standard vision and sound signals. These signals are fed to a monitor station 33 and via a delay 34 to a mixer 35. At the monitor station 33 an operator watches and listens to the programme being made in front of the camera 30 and microphone 31. On the occurrence of a possibly undesirable sound or visual event, the operator presses an appropriate key to indicate the presence of such an event and also its nature and grading. The operator keeps the relevant key (or keys where both possibly undesirable sound and visual events occur together) pressed throughout the duration of the event concerned. The pressing of a key results in a teletext unit 36 inserting into the composite television signal produced by the mixer 35, the appropriate row address coding indicative of the nature and grade of event noted by the operator. The coding is inserted during the next-occurring field blanking period by the inclusion of a teletext data line corresponding to the header row of a page. The inserted data line thus contains not only the row address coding but also the appropriate magazine and page number identifying the row address as one related to the editing out of undesired events.

The purpose of the delay 34 is to delay the vision and sound signals for a period corresponding to the approximate reaction time of the operator so as to ensure that the event codings are inserted into the composite television signal substantially in synchronism with the sound or vision signal representing the event coded.

The composite television signal produced by the mixer 35 is fed to a transmitter 37 feeding an aerial 38.

Where the teletext unit 36 is used to transmit a normal teletext service as well as the event codings of the present invention, the insertion of an event coding will, of course, interrupt the normal sequence of teletext data transmission. After the insertion of each event coding the unit 36 is arranged to commence the re-transmission of any data page interrupted, Furthermore, as will become clear hereinafter, the present embodiment of the invention is so arranged that it is not necessary to insert an event coding during each field blanking period occurring during the concurrency of a possibly undesirable event; as a result, the interruption of the normal teletext service by the insertion of event coding is minimal. Of course, the unit 36 could be dedicated to the transmission of event codings, the normal teletext service being omitted entirely.

Shown in the lower half of FIG. 3 is a television receiver provided with an automatic edit controller embodying the present invention. The FIG. 3 receiver, like that of FIG. 1, comprises receiving circuits 10 outputting video and sound signals, on lines 11 and 12 respectively, to circuits 13, 15 and 18 supplying vision and sound signals to a television tube 16 and loudspeaker 19. Gates 14 and 17, provided in the lines 11 and 12 respectively enable the vision and sound signals to be selectively blanked.

The edit controller associated with the television receiver of FIG. 3 comprises a teletext type decoder 40 arranged to continuously monitor the video signal on line 11 to identify from the received teletext data any row addresses indicating the presence of a possibly undesirable event in the programme currently being receive. To this end, the decoder 40 is fed from a memory unit 41 with the predetermined magazine and page number identifying the teletext page whose row addresses are indicative of the event categories GS1 to 4 and GV1 to 4. Upon the recoder 40 identifying a row address coding on the relevant teletext page, this address coding is immediately output to a comparator 42 or 43, the codings GV1 to 4 being output to the comparator 42 and the codings GS1 to 4 to the comparator 43.

The grade or grades of sound and visual events that it is desired to edit out are set in using an edit select unit 44, access to this unit being restricted by the provision of a lock 45 which may be mechanical or electronic. The unit 44 is arranged to output to the comparator 42 the least undesirable grade of visual event it is required to edit out; in addition, the unit 44 outputs to the comparator 43 a code indicating the least undesirable grade of sound event to be edited out.

Upon an event coding being fed to the comparator 42 which is equal to the code supplied thereto by the unit 44 or represents a more undesirable visual event than that code, the comparator 42 outputs an edit pulse which is expanded by the timer 46 into an inhibit signal of fixed duration (for example ½ second duration). This inhibit signal is fed to the gate 14 and is used to block the video signal from receipt by the circuit 15. In a similar manner, when the comparator 43 receives an event coding indicating a sound event which is of equal or greater undesirability than that represented by the code from the unit 44, the comparator 43 outputs an edit pulse which is expanded by a timer 47 into a ½ second inhibit signal controlling the gate 17 in the sound signal line 12.

In this manner, the sound and vision signals are selectively blanked upon the occurrence of a grade of sound or vision event which it is desired to edit out.

The presence of the timers 46 and 47 means that it is only necessary to insert an event coding at the beginning of each event and thereafter at ½ second intervals (or slightly less) during the currency of the event. This feature enables normal teletext services to be provided by the transmitting station with only minimal interruption due to the insertion of event codings.

If desired, while the sound and/or vision is being blanked, a message can be displayed on the tube 16 indicating the reason for the blanking. In the embodiment illustrated in FIG. 3, this message is derived from data contained in the data row carrying the event coding causing the blanking, this character data being extracted by the decoder unit 40 and passed to a message display control unit 48 over a line 49. The unit 48 includes a character generator and various control circuitry which in the presence of an inhibit signal from the timer 46 or 47, causes an appropriate video signal to be fed to the video circuit 15. This video signal is arranged to display a message on a restricted portion of the television screen since, of course, the vision signal may still be open for display. In this latter case, to avoid the simultaneous presentation of the normal vision signal and a message from the unit 48, this unit is arranged to inhibit the vision signal, using the gate 14, during the portion of each television field corresponding to the area of the screen where said message is to be presented.

The edit controller shown in FIG. 3 has been described in relation to broadcast television transmissions received from one transmitting station. However, of course, the edit controller will operate to effect automatic editing of a television signal regardless of its source provided that the event coding is inserted into the television signal in a standard manner (in the present case, on a predetermined page of a teletext format). Furthermore, the edit controller need not necessarily be provided as part of a television receiver but can be included at the input or output of a video tape recorder or at the output of a video disc player. It will also be appreciated that the described form of event coding is only one of a number of possible ways in which such coding can be inserted into a television signal, although it is preferred to utilise a teletext type of coding due to the availability of teletext decoding integrated circuits. Of course, while it is preferred to insert event codings during field blanking periods of a television signal, this need not necessarily be the case, particularly where the format of the television signal allows data to be inserted during any line period (such as may be the case with digitally encoded signals for use in satellite broadcasting).

Various other modifications are of course possible to the edit controller illustrated in FIG. 3.

I claim:

1. A method of providing for the editing of the output of sound and visual portions of a television set, comprising the steps of:
   (a) inserting into a television signal, prior to mass distribution, coding which individually identifies, as they occur, possibly undersirable sound and visual events forming part of a programme represented by said signal, the coding indicating the sound or visual nature of each said event,
   (b) monitoring the television signal to identify said coding,
   (c) determining from the coding identified in step (b) the time of occurrence and nature of said possibly-undersirable events which are to be edited out, and
   (d) inhibiting the intelligible output, via said set, of the sound portion of said television signal when the determination effected in step (c) indicates the presence of a sound event to be edited out, and inhibiting the intelligible output of the vision portion of said signal when the determination effected in step (c) indicates the presence of a visual event to be edited out.

2. A method according to claim 1, characterised:
   in that the said coding inserted into the television signal is used to identify a range of events of varying degrees of possible undersirability, the coding including a grading indicating the degree of possible undesirability of each said event, and
   in that step (c) involves comparing the event grading included in the coding identified in step (b) with a predetermined code indicative of an undesired grade or grades of event, the result of this comparison being used to identify the events to be edited out in step (d).

3. A method according to claim 1 or claim 2, characterised in that said coding is inserted into said television signal as a teletext type signal.

4. A method according to claim 3, characterised in that said coding takes the form of one or more row addresses of a predetermined teletext page.

5. A method according to claim 1, characterised in that said coding is inserted into the television signal by passing the signal through a fixed time delay while an operator views and listens to the programme represented by the signal and inserts a suitable said coding upon the occurrence of a said possibly-undesirable event, the time delay serving to compensate for the non-instantaneous reaction of said operator to such an event.

6. A method according to claim 1, characterised in that coding identifying each possibly-undesirable event is only intermittently inserted in said signal during the event, and in that inhibition of the sound or vision portion of said signal, following each determination of the occurrence of an event to be edited out, is effected for a predetermined time period which is of greater duration than the interlude between successive insertions of coding identifying the event.

7. A method according to claim 1, wherein during the inhibition of a said portion of the said television signal, a video character signal is added to the said television signal to provide a visual display, at said set, indicative of the reason for said inhibition.

8. A controller for editing out undesired sound and visual events from a television signal where this signal includes coding individually identifying, as they occur, certain possibly-undesirable events forming part of a programme represented by the signal, the coding including an indication of the sound or visual nature of each said event; said controller comprising:

monitor means (40) for monitoring the television signal to identify said coding and output a corresponding coding signal, signal processing means (40,42,43,44) connected to receive said coding signal and arranged to determine therefrom the time of occurrence and nature of said certain possibly-undesirable events, these latter events being events which are to be edited out, and produce inhibit signals in response thereto and inhibit means (14,17) arranged to operate on said television signal in response to said inhibit signals such as to inhibit the intelligible output from said controller of the sound portion of said television signal when the signal processing means (40,42,43,44) indicates the presence of a sound event to be edited out, and to inhibit the intelligible output from the controller of the vision portion of said television signal when the signal processing means (40,42,43,44) indicates the presence of a visual event to be edited out.

9. A controller according to claim 8, intended for use where said coding is used to identify a range of events, including said certain events, of varying degrees of possible undesirability, the coding including a grading of each said event, characterised in that said signal processing means comprises:

selection means (44) enabling an operator to set in the grade or grades of event to be edited out, the selection means (44) being arranged to store a grade signal representative of the set in grade or grades, and comparator means (42,43) for comparing the said coding signal with the said grade signal whereby to determine which events are to be edited out by said inhibit means (14, 17).

* * * * *